May 11, 1926.
C. V. HALL
TIRE PATCH
Filed August 30, 1924
1,583,878
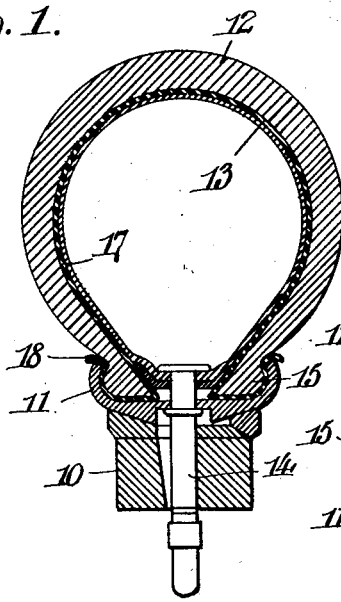
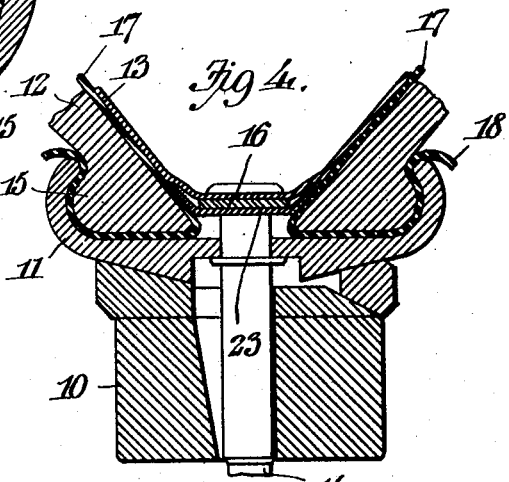
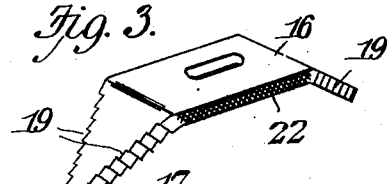
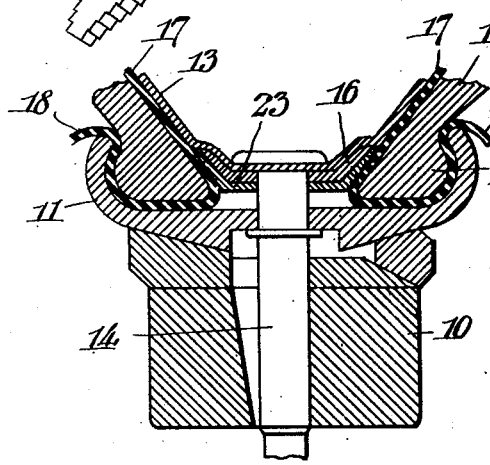
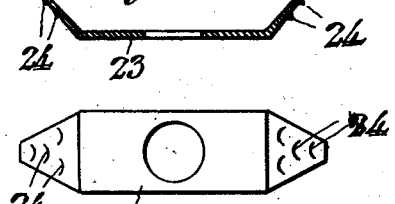
Charles V. Hall,
INVENTOR.
BY
ATTORNEYS.

Patented May 11, 1926.

1,583,878

UNITED STATES PATENT OFFICE.

CHARLES V. HALL, OF WASHINGTON, DISTRICT OF COLUMBIA.

TIRE PATCH.

Application filed August 30, 1924. Serial No. 735,077.

This invention relates to repairing devices for use in connection with pneumatic tires, and has particular reference to tire patches to be inserted in the casing or shoe of inflatable motor vehicle tires.

As is generally known to those familiar with the repair of inflatable motor vehicle tires, blowouts, rim cuts, punctures and other injuries to the outer tire casing or shoe are usually temporarily repaired with what is commonly known as a "wing patch." This wing patch is made of a sheet of tough, pliable fabric of sufficient breadth to laterally circumscribe the inner tube of the tire, and is provided at its ends with wings or flaps of small thickness adapted to be engaged and clamped between the beads of the shoe and the supporting rim for the latter. In applying such a patch, the fabric sheet is interposed between the inner tube and the shoe in such position as to bridge the cut or hole in the shoe, and the thin flaps of the sheet are engaged between the tire beads and the holding rim. When the tire is inflated, the pressure exerted in an outward direction upon the shoe beads causes a more or less degree of binding between the latter and rim. This internal pressure is also exerted upon the patch throughout the transverse circumference of the tire, causing the sheet of protective material to be bound between the inner tube and the shoe. The agency relied upon entirely to maintain the patch in place is friction created by internal air pressure as well as by tightening of the valve stem, this friction occurring throughout the breadth of the protective sheet and between the shoe beads and the rim. For ordinary purposes, that is, where the abrasion in the shoe is of a minor nature, and where the cut or hole occurs in the tire tread, as distinguished from the side of the casing, this "wing patch" assembled as above outlined, has proved fairly satisfactory. Such repairs, however, are considered temporary expedients, and the wing patch is not intended to remain in the tire permanently. It is a fact that heretofore it has been impossible to maintain a "wing patch" firm against shifting movement, either laterally or longitudinally of the tire, the reason being that the internal pressure, regardless of the degree to which the tire is inflated, is insufficient to positively bind the patch in position against creeping when the tire is in use. In order that the tire beads may properly seat in the rim, and to permit of the wings of the patch properly conforming to and fitting snugly with the shoe beads, it is essential that these flaps be of thin pliable fabric, yet they must be sufficiently strong to obviate the possibility of tearing or breaking away from the body of the patch when in use.

The creeping action of the patch assists sand and grit to work into the casing through the abrasion therein, and these foreign substances find their way to the inner tube surface underlying the patch. The continual creeping or shifting action then, obviously, causes the inner tube to weaken and to eventually break.

In instances where the outer casing or shoe sustains a cut or blow-out of any appreciable size, either in the tread or the side thereof, the ordinary "wing patch" is of little or no value, due to the fact that the internal pressure causes the patch to bulge out through the hole in the shoe. This bulging of the patch occurs because the friction between the casing and inner tube and between the beads and the tire rim is insufficient to withstand the internal outward pressure at the point of break in the casing. In instances where side or rim cuts occur, the "wing patch" is practically valueless, as the inflated inner tube forces the side of the patch through the broken tire and exerts a pull directly upon the flap or wing closest to the rupture, as the clamping action between the bead and this flap is inadequate to withstand this strain.

The primary object of the present invention is to provide means whereby the ordinary "wing patch," without any alteration or change therein whatever, may be inserted in the usual way in the tire and held firmly and securely therein against any movement, either circumferentially or laterally of the wheel.

A further purpose of the invention is to provide means in connection with standard tire parts whereby a patch possessing all the valuable qualities and features of the "wing patch," may be assembled in the shoe in such manner as to overcome all the disadvantages and objections present in and incident to the use of the "wing patch."

With these objects in view, together with others which will appear as the description proceeds, the invention consists in the novel construction, combination and arrangement of parts, all as will be disclosed more fully hereinafter, illustrated in the accompanying drawings and particularly pointed out in the claims.

In the drawings:

Fig. 1 is a transverse sectional view taken through a conventional form of inflatable motor vehicle tire and rim, and illustrating one embodiment of the invention, Fig. 2 is an enlarged sectional view taken through a valve spreader such as used in carrying out one form of the invention, Fig. 3 is a perspective view of a slightly different form of valve spreader, constructed in accordance with the invention, Fig. 4 is a fragmentary view, on a slightly enlarged scale, taken through a tire and rim and showing a modified form of the invention, Fig. 5 is a similar view showing a different use of the clamp plate, Fig. 6 is a longitudinal sectional view taken through a supplemental clamping plate, and Fig. 7 is a bottom plan view of the clamp shown in Fig. 6.

Referring to the drawings, the wheel felly is indicated at 10, the rim at 11, the casing or shoe at 12, the inner or inflatable tube at 13, the valve stem at 14, the shoe beads at 15, and the valve spreader at 16. The ordinary "wing patch" is indicated at 17, and is shown as applied in the usual well known manner. All these parts are of familiar construction and assemblage.

In applying the patch, the body or thickened portion is inserted in the shoe so as to bridge the cut or abrasion therein, and the inner tube is then positioned properly withing the casing. The edges of the patch are then brought about the beads so that the wings or flaps, indicated at 18, are interposed between the beads of the casing and the rim. The cut portion of the casing is positioned so as to lie close to the valve portion of the inflatable tube, preferably radially alined with the said tube. The tire, thus assembled, is then applied to the rim 11, with the stem 14 projecting through the opening provided in the said rim. The valve spreader 16, however, is first applied to the valve stem in the usual manner so that the outwardly inclined ends thereof will perform their function of spreading the casing and wedging the beads thereof firmly in the curled edges of the rim 11. The present drawing illustrates a clincher rim, but of course the patch is also adaptable to the straight side tire and rim.

In carrying out the invention, means are provided for clamping or in other manner rigidly securing the wing portions of the patch to the interior of the shoe, so that relative movements between the shoe, patch and inner tube will be prevented. This clamping action may well be carried out by providing means in connection with the relatively fixed valve stem for locking the patch and shoe together. In a preferred form of the invention, the usual valve spreader is employed to provide the necessary gripping action, and the outer faces of the wedging ends of the spreader are roughened, milled or ribbed as indicated at 19, so that these roughened portions will bite into and firmly grip the adjacent portions of the patch 17, thus providing a firm anchor for the patch adequate to resist any tendency of the patch ends to pull out toward the tread of the shoe. The teeth constituting this ribbed, milled or roughened portion are preferably, though not necessarily, of insufficient depth to cut entirely through the somewhat thickened portion of the patch lying adjacent thereto, but the depth of this bight will be sufficient to cause adherence of the patch fabric to the spreader and to clamp the latter to the adjacent portion of the outer casing. When the tube is inflated and the valve stem has been tightened, usually by means of a lock nut (not shown), the spreader will be brought in tight engagement with the patch and the locking and clamping actions will be complete.

In instances where a valve spreader of the type shown in Fig. 3 is employed, the lateral edges 22 of the spreader will be milled or ribbed in substantially the manner shown, and the gripping and binding action will be properly carried out. It may be preferred to slant the teeth of either or both of the valve spreaders as shown in Fig. 3, so that a positive grip will be obtained when the spreader is moved inwardly, yet the grip will be broken and the patch released immediately when the spreader is moved outwardly. It will be understood, of course, that the spreader shown in Fig. 3 is to be applied to the tire so as to extend circumferentially thereof, with the wedge shaped inclined ends fitting between and causing the patch to be clamped against the opposing inner ends of the casing: the long edges 22 also entering into and assisting in this clamping action.

In instances where the teeth or ribs of the valve spreaders are sufficiently deep to bight materially into the fabric of the patch, it may be found desirable to dispense entirely with the flaps 18, as, it will be understood, in such case they would be of little or no value, however, for their aid in properly applying the patch to the casing, and for the little value they would render in assisting to maintain the patch in the shoe, they may be retained on the protective sheet.

In the preferred embodiment of the invention, I have described the valve spreader 16 per se as having its inclined ends roughened, serrated or milled on their outer faces. Should it be found inexpedient to so treat the valve spreader, an additional clamp or spreader plate 23 may be used. Such plate may be constructed as shown in Figs. 5 and 6 of the drawing, and will fit upon the valve stem of the tire precisely the same as the spreader already associated with the inner tube. The clamping action, due to inflation of the tire and when the nut upon the valve stem is tightened, will, therefore, be transmitted from the original spreader to the supplemental spreader, (see Fig. 5) whereby the teeth 24 of the latter will bite into the adjacent portions of the patch and cause the same to adhere firmly to the inner faces of the adjacent casing parts.

In instances where a spreader of the type shown in Fig. 3 is employed and it is found inexpedient or undesirable to serrate or roughen the inclined edges thereof, a supplementary spreader such as referred to above may be employed to hold the patch firmly in position. In such case, (see Fig. 4) the supplementary spreader 23 will underlie the original spreader 16 with the central openings thereof in register with each other to receive the valve stem and the supplementary spreader will be disposed transversely of the tire or at right angles to the disposition of the longitudinally extending spreader. When the tire is inflated and the clamping nut for the valve stem is tightened, the original spreader will be forced down upon the supplemental spreader, 23 whereby the teeth of the latter will be firmly embedded in the patch and the latter will thus be held securely to the adjacent casing parts.

In the foregoing description I have described the supplemental spreader as being constructed of some rigid metal, however, it will be understood that the invention is not to be limited to any particular material of which the supplemental spreader may be formed, nor to any particular shape it may have. Such spreaders may be constructed of tough fabric such as canvas, or of leather or raw hide, having prongs or hooks in the ends thereof to contact with the patch, or the outer ends of the supplemental spreaders may be faced with material of any suitable kind roughened, or in any preferred manner treated so as to produce frictional contact of a high degree between the ends of the supplemental spreader and the adjacent faces of the patch.

It will be understood that the teeth of the clamp or spreader need be only so deep as to enable the spreader to secure a firm and positive grip upon the fabric of the patch, as inflation of the tire and tightening of the valve stem in the felly will cause the spreader to rigidly bind the patch fabric between itself and the adjacent portions of the shoe. Should it be found practical or desirable, however, these teeth may be made sufficiently long to enter the fabric an appreciable distance or to entirely penetrate it and to engage in the adjacent portions of the shoe.

By constructing the clamp and applying the patches in accordance with the foregoing, it is obvious that cuts or abrasions in the casing will be securely sealed and held closed until the tire is removed from the rim. The patch is therefore of a more or less permanent nature and by the changes herein proposed the ordinary ineffective wing patch is converted into an efficient sealing medium for cut or broken tires, effective until the tire is taken from the rim.

It is preferred that the valve spreader, for purposes of carrying out the invention, be relied upon as the means for clamping the patch in the casing, merely because such spreaders are a part of the usual tire construction as at present and are admirably adapted to this use, however, it will be understood that other devices distinct from the valve spreader but operating in a similar manner such as the supplemental spreaders or clamp plates heretofore described, are fully within the spirit and scope of the invention.

I claim:

1. In combination, a patch adapted to be inserted in a tire between the inner tube and the shoe, and outwardly projecting members on the valve spreader to engage the patch and clamp the same against the shoe.

2. In a device of the class described, a patch adapted to be inserted in a tire between the inner tube and the casing thereof, a spreader adapted to engage the said patch and to force the same against the walls of the casing, and projections on the outer surface of the spreader to bite into said patch.

3. In a device of the class described, the combination with a patch inserted in a tire between the inner tube and casing, of a supplemental spreader adapted to be applied to a tire and to be secured therein between the inner tube and patch, and roughened portions on said supplemental spreader to contact with and bight into portions of the patch.

4. In a device of the class described, the combination with a patch adapted to be inserted in a tire between the casing and the inner tube thereof, of a clamping member interposed between the spreader and the patch, and gripping members on said clamping member to engage with said patch.

5. In a device of the class described, the combination with a patch inserted between the inner tube and casing of a tire, of a plate associated with the valve stem of the tire and between the spreader and patch, and gripping members on said plate to engage with said patch.

6. In a device of the class described, the combination with a patch inserted between the inner tube and casing of a tire, of a plate attached to the valve stem of the inner tube and interposed between the spreader and the patch, and prongs on the portions of said plate engaging said patch.

In testimony whereof he affixes his signature.

CHARLES V. HALL.